Nov. 1, 1960 L. H. BEST 2,958,425
RACKS
Filed Aug. 15, 1956 2 Sheets-Sheet 1

Inventor
Leon H. Best
By Wallace and Cannon
Attorneys

Nov. 1, 1960  L. H. BEST  2,958,425
RACKS
Filed Aug. 15, 1956  2 Sheets-Sheet 2
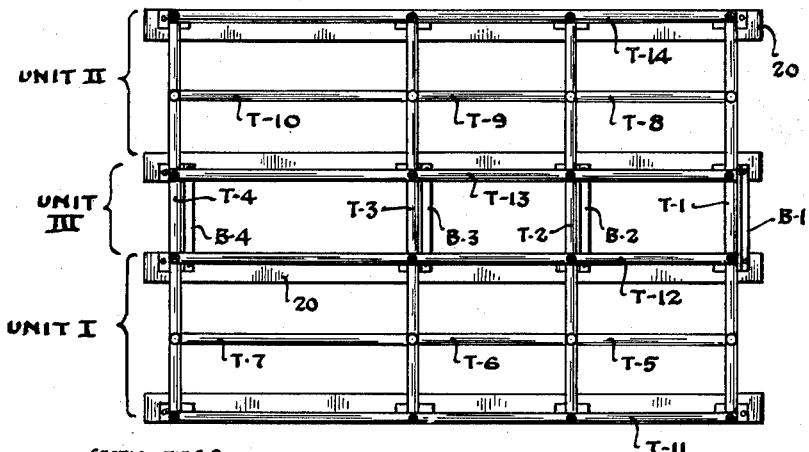
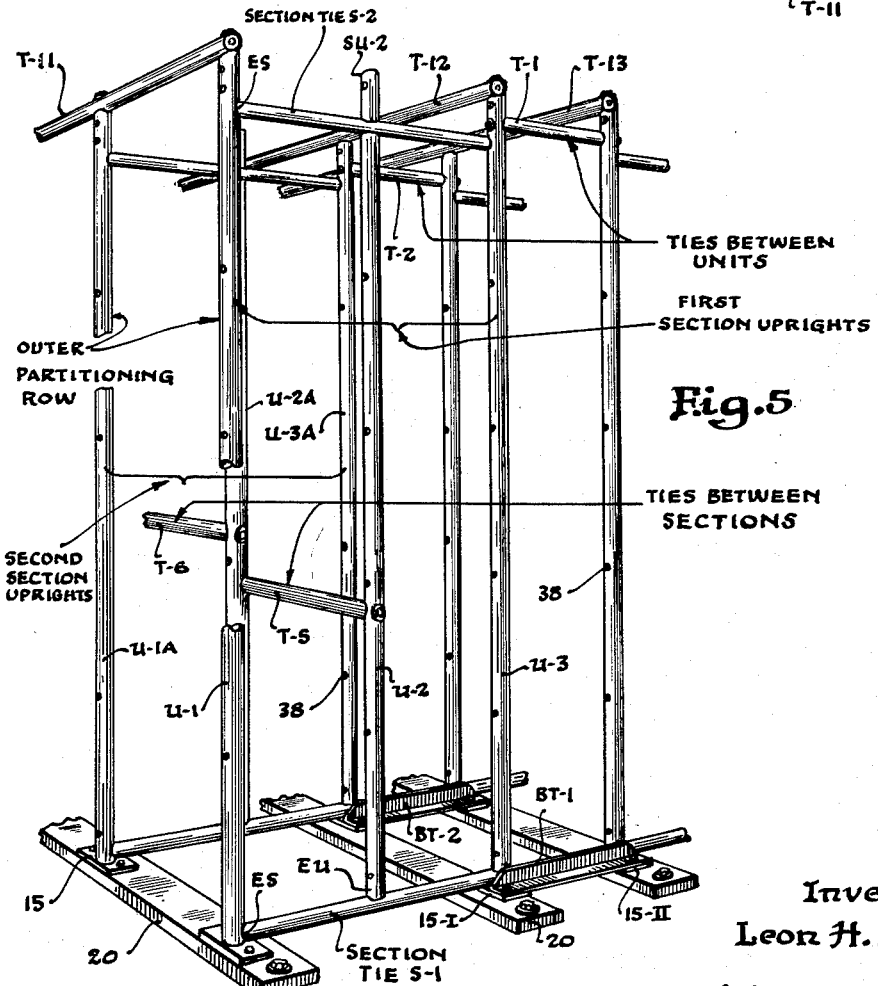
Inventor
Leon H. Best
By Wallace and Cannon
Attorneys United States Patent Office 2,958,425
Patented Nov. 1, 1960

1

2,958,425
RACKS

Leon H. Best, Galva, Ill., assignor to John H. Best & Sons, Inc., Galva, Ill., a corporation of Illinois Filed Aug. 15, 1956, Ser. No. 604,157

2 Claims. (Cl. 211—44)

This invention relates to storage racks adapted to support relatively heavy articles such as crated linoleum, roll material, or the like.

Merchandise such as crated linoleum, broadloom carpet rolls and the like, present somewhat difficult storage problems in instances where it is desired to withdraw articles of this cumbersome nature from storage for sale or display purposes. Thus, in storing heavy articles such as crated linoleum, carpet rolls and the like in random tiers or stacks, selection of a particular article from storage may entail considerable shifting in order to gain access to the desired article, and the primary object of the present invention is to enable cumbersome articles of the foregoing character to be conveniently stored or shelved so as to enable any selected article among those so stored to be readily selected for withdrawal from storage without disturbing or otherwise handling stored articles not to be withdrawn.

Specifically, it is the object of the present invention to store cumbersome articles of the foregoing kind in a storage rack comprising uprights arranged in partitioning rows which define a plurality of storage sections spaced one from the other. Rollers are arranged between the uprights in vertically spaced relation, and in respect of the several sections of the rack these rollers are arranged in corresponding horizontal planes defining a plurality of vertically tiered storage cubicles enabling crates or the like to be, in effect, shelved one above the other. By providing a storage rack of this nature, crated items, heavy roll material or like articles can be stored with ends thereof exposed to view, enabling selection to be made when it is desired to withdraw an article from storage in the rack. Inasmuch as each article is individually floated on rollers, a particular article can be easily withdrawn from the storage rack when desired, leaving intact the remainder of the stored items.

Other and further objects of the present invention will be apparent from the following description and claims and are illustrated in the accompanying drawings which, by way of illustration, show a preferred embodiment of the present invention and the principle thereof, and what is now considered to be the best mode contemplated for applying that principle. Other embodiments of the invention, embodying the same or equivalent principles may be used, and structural changes may be made as desired by those skilled in the art without departing from the present invention and the purview of the appended claims.

In the drawings:

Fig. 4 is a top plan view of the rack; and

Fig. 5 is a partial perspective view showing the rack at an intermediate stage of assembly.

Figure 1:
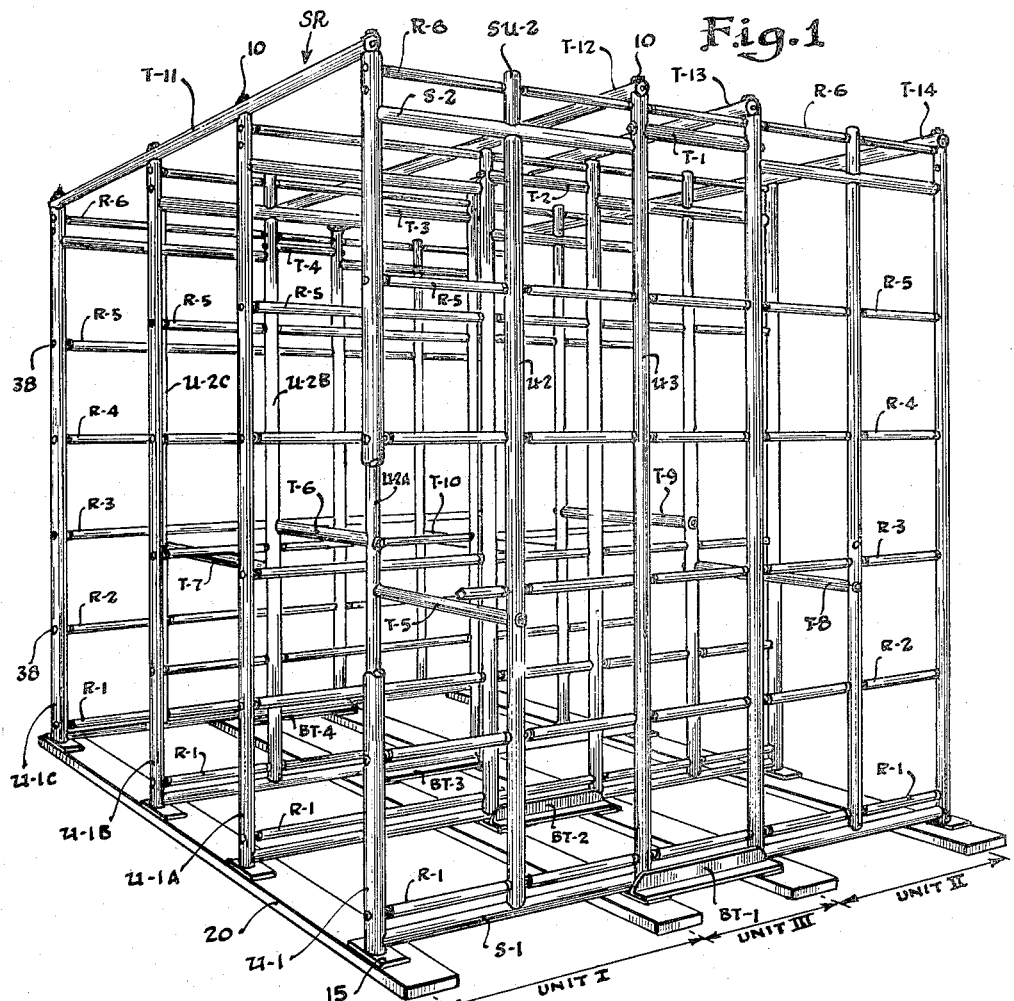
Fig. 1 is a perspective view, broken away in part, of a storage rack constructed in accordance with the present invention.

The present invention is illustrated in Fig. 1 as embodied in a storage rack SR adapted for storage of elongated, cumbersome articles such as linoleum shipped to a distributor or merchandiser in rolls enclosed in crates. Crates of this kind are relatively large, approximating twelve feet in length, and are difficult to handle, particularly if stored at random in a heap, since, when it is desired to select from random storage a roll of linoleum for display or comparison purposes, it is usually necessary to sort through the entire heap, shifting the articles until the desired article is reached.

The rack SR of the present invention enables crated linoleum, roll material or like cumbersome articles to be arranged in tiered cubicles under conditions such that any selected article can be withdrawn from a cubicle in the rack allocated thereto. As will be explained, the rack SR herein illustrated, embodies three units, I, II and III, Figs. 1 and 4, and this relation can be multiplied or reduced to any convenient extent.

The rack unit I comprises uprights in the form of elongated metal tubes as U–1, U–2 and U–3 which are arranged in parallel uniformly spaced apart side-by-side or lateral relation as shown in Figs. 1 and 5, and these uprights are joined as by weldments at their lower ends to a horizontal base tube or lower section tie S–1 to thereby afford what will herein be termed a rigid upright section as indicated by legend in Fig. 5. Preferably, the aforesaid section uprights are connected adjacent their upper end portions to a like horizontal section tie member or tube S–2, and this joining of the uprights to the upper section tie member as S–2 is also accomplished by welding. Thus, where ends ES, Fig. 5, of the section ties are welded to the section uprights, the ends of the section ties are cut in a concave manner so as to be saddled on the uprights for welding. Likewise, where ends as EU of the uprights are saddled on portions of the section ties S–1 and S–2, such ends are also made concave.

As shown in Figs. 1 and 5, the two outer uprights U–1 and U–3 of the section being described for unit I extend upwardly beyond the upper section tie S–2. A relatively short stub upright SU–2 is formed at its lower end with a saddle and is welded to the intermediate portion of the upper section tie S–2 opposite the upper end of the long intermediate upright U–2, so as to thereby afford what amounts to an extension of the intermediate upright U–2 corresponding to the upper extensions of the outer uprights U–1 and U–3. The purpose for this will be pointed out hereinbelow.

A plurality of such sections are afforded one behind the other in a unit as I, Fig. 4, as will be observed in Figs. 1 and 5, which is to say that under the present invention, the rack SR has a second set of laterally related uprights U–1A, U–2A and U–3A in a second section arranged behind the first section uprights U–1, U–2 and U–3, and this arrangement, in the present instance, is repeated for four sections as will be apparent from Fig. 1. Such arrangement provides an outer longitudinal or front-to-rear row of uprights as U–1, U–1A, U–1B and U–1C, Fig. 1, aligned in a row proceeding from the front to the rear of the rack, a like intermediate row of uprights behind the intermediate upright U–2, and a like outer row of uprights behind the outer upright U–3. These front to rear uprights define what will be termed partitioning rows. Each such section in unit I is, of course, a duplication of the section that was described in detail above.

It was mentioned that the rack SR can be so assembled as to afford rack units I, II and III. The upright sections in unit II are identical to that described above for unit I, and units I and II are joined to the intermediate rack unit III by horizontal top tie members in the form of tubes T–1, T–2, T–3 and T–4, Figs. 1 and 4, having ends bolted to the adjacent or opposed uprights of sections I and II in a way to be explained below.

The sections of uprights are joined in a rigid lattice work, and such is attained in part by securing the upper ends of the outer partitioning rows of uprights as U–1, U–1A and so on, U–3, U–3A and so on, Fig. 1, to elongated front-to-rear tubular inter-section tie members T–11 and T–12. Thus, the ties T–11 and T–12 are associated with unit I, and a like pair of tubular tie members T–13 and T–14 are associated with the outer partitioning rows of uprights in unit II. While any convenient method of attachment may be used for this purpose, I prefer to rely upon the method of attachment shown in Fig. 3, for reasons to be pointed out below. Thus, apertures are formed in the walls of the tie members T–11, T–12, T–13 and T–14 at points corresponding in spacing to the front-to-rear spacing of the outermost uprights defining the upright sections in the two rack units I and II. Bolts 10, Fig. 3, have the shanks thereof passed through such apertures so that the heads of the bolts repose on the upper parts of the tie members T–11, T–12, T–13 and T–14. Plates 11 are fastened in place below the upper openings in the outer uprights as U–1 and U–1A, and these plates are provided with threaded openings serving as nuts for the bolts 10. This same kind of fastening is used for the ties T–1, T–2, T–3 and T–4 that tie the rack units I and II together to afford at the same time the intermediate rack unit III. The plates as 11 are, of course, disposed within the particular tubular member that is to anchor a bolt and will be disposed in horizontal or vertical planes depending upon the direction of the bolt as will be apparent from Fig. 3.

Additional rigidity and spacing is afforded by tubular tie members T–5, T–6 and T–7 that tie together the intermediate uprights as U–2, U–2A and so on in the intermediate partitioning row in unit I, and like tie members T–8, T–9 and T–10 are used for the intermediate partitioning row of uprights in unit II. These inter-section tie members as will be observed in Figs. 1, 4 and 5, are each of a length to span between only the immediately adjacent uprights in the intermediate partitioning rows and are joined to the uprights by bolt means in the same fashion described above in connection with Fig. 3.

Figure 3:
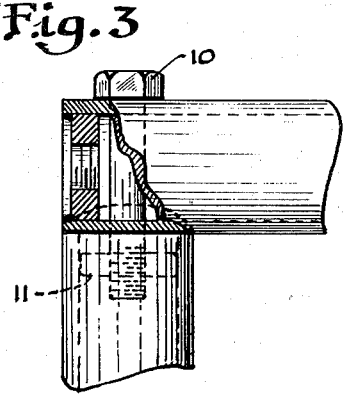
Fig. 3 is a detail view, partly broken away, showing the way in which tie members are associated with the uprights of the rack.

The rack of the present invention can be conveniently erected from a knocked-down state, inasmuch as each section made up of uprights as U–1, U–2 and U–3 is individually fabricated and can be shipped or transported as such. Consequently, the individual sections can be set up and then joined one to the other to afford a rack unit by means of the tie members as T–5, T–6, T–7, T–11 and T–12, for rack unit I, and it is for this reason that separable bolt attachments, as in Fig. 3, are utilized.

The lower ends of the outer uprights as U–1 and U–3 in each rack unit are provided with stabilizer plates 15, Figs. 1 and 5, which, if desired, can be secured by weldments to the lower ends thereof extended below the section ties S–1. In order to distribute the weight on the rack, it has been found advantageous to provide elongated wooden floor plates 20 on which the stabilizer plates 15 repose and the stabilizers can be readily fastened to the floor plates by lag screws extended through the stabilizers into the floor plates.

It will be appreciated that in assembling a rack as SR, one or more units are utilized as space or necessity requires, but under the present invention an intermediate rack unit III is conveniently afforded in those instances where space admits of such together with the rack units as I and II joined thereby. In such instances, the stabilizer plates 15–I and 15–II, Fig. 5, of the adjacent outer uprights in the rack units I and II are preferably joined by plates, there being four such plates, BT–1, BT–2, BT–3 and BT–4, Fig. 1. These plates can be flat or angled as desired and are fastened in place by the same lag screws that are used to fasten the stabilizers 15–I and 15–II to the corresponding floor plates 20.

The rack SR is divided into a plurality of vertically tiered cubicles which can be viewed as extending from the front to the rear of the rack. To this end, rollers are extended between the uprights, and the arrangement is such that the rollers that are behind one another in the several rack sections are disposed in common horizontal planes.

Thus, as shown particularly in Fig. 1, rollers R–1, R–2, R–3, R–4 and R–5 are spaced one above the other between the uprights of each section that are disposed in side-by-side or lateral relation. Other or topmost rollers R–6 are also afforded, and the particular arrangement of the rollers R–6 will be described separately in detail below. It will be further observed that in a front-to-rear sense, all rollers such as the four rollers R–1, Fig. 1, at the bottom of the rack are disposed in a common plane, and the number of rollers in any plane and the spacing thereof will, of course, be pre-determined as adequate to provide sufficient support for the articles disposed in such planes as will be described below.

The uprights in each section are spaced apart sufficiently to accommodate the particular width dimension of the crates or other articles to be stored in the rack, and the vertical spacing between the rollers is pre-determined as sufficient to accommodate the height dimension of the stored articles. In other words, any vertical pair of rollers as R–1 and R–2 or R–2 and R–3 together with the portions of the opposed uprights common to this pair of rollers define a rectangular area of somewhat greater area than the vertical section of an article to be stored in the rack, and the area of the rack thus defined when projected from the front to the rear of the rack traces out an elongated cubicle into which an article can be passed, so that the bottom of the article reposes on the rollers that define the bottom or shell plane of such a cubicle. In the particular rack shown in Fig. 1, it will be recognized that twenty-five cubicles are thus afforded, ten such cubicles being arranged in two tiers in the rack unit I, ten such cubicles being arranged in two tiers in the rack unit II, and five such cubicles being arranged in a single tier in the intermediate rack unit III.

It will be appreciated that the purpose of the rollers is not only to provide support for the articles in the rack but also to facilitate free movement of an article into the rack by virtue of the rolling friction afforded by the rollers. Thus, when a particular article is to be initially stored in the rack one end is first supported on a front roller, and the article is then thrust inward into the cubicle and is rolled progressively from the front to the rear of the rack until the leading end portion thereof reposes on the rear roller of the cubicle, and the article is then adjusted or shifted on the rollers until the desired degree of end projection of the article at the front or at the rear of the rack has been obtained. This advantageous utilization of rollers in present instances is of primary importance while storing articles in the topmost cubicle tiers of the rack.

Figure 2:
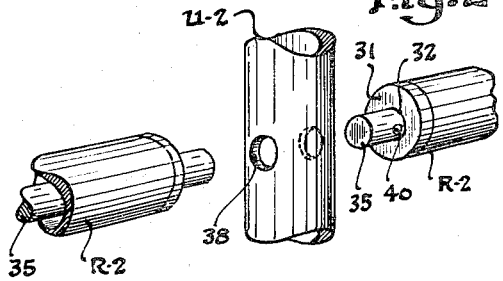
Fig. 2 is an exploded perspective view of parts showing aspects of support for the rollers, these parts being broken away.

In supporting the rollers on the uprights, I have found it particularly advantageous to provide the rollers in the form of hollow sleeves as shown in Fig. 2. The rollers are provided with end caps 31 which are formed with apertures as 32 serving as bearings, and axles in the form of elongated solid shafts 35 are selected of such length as to pass through the bearing apertures in the end caps of a particular roller so that end portions thereof extend outward of the end caps.

Bearing openings 38, Fig. 5, are also formed in the uprights as U–1 and are spaced one above the other in spaced relation conforming to the vertical distance by which the rollers are to be spaced. Openings 38 are thus provided at diametrically opposed positions on opposite sides of each upright, and the opposed ends of an axle shaft as 35 are extended into the aligned bearing openings 38 of adjacent side-by-side uprights as will be readily apparent from Fig. 1. The ends of the axle shafts 35 outwardly to the bearing caps 31 are formed with openings 40 extending through the shafts, and cotter pins (not shown) are passed through the openings 40 and then spread so as to provide end spacers serving to prevent engagement between the uprights and the end caps of the rollers.

Inasmuch as bearing openings 38 are pre-formed on both sides of any upright of the rack, the tiered row of uprights defining the outer side of the rack, such as the outer left hand row of uprights U-1, U-1A, U-1B and U-1C, shown in Fig. 1, have exposed or outwardly facing bearing openings 38. Hence this enables an additional rack unit to be coupled or joined to the uprights U-1, U-1A, U-1B and U-1C with the axles of the rollers of such additional rack unit journaled in the bearing openings 38 shown in Fig. 1. It will be appreciated that this is the way in which the rollers of rack unit III are joined to the right-hand outer uprights of rack unit I.

It was mentioned that the topmost rollers of the rack are the rollers R-6. These rollers are, in effect, supplemental rollers which afford tiers above the tiers represented by the rollers R-5. Thus, the stub uprights as SU-2 are formed with bearing openings as 38 which are aligned with like bearing openings formed in the portions of the uprights U-1 and U-3 above the section tie S-2, and the same arrangements for rollers R-6 prevails at rack unit II. The topmost rollers for the intermediate rack unit III are supported above the ties as T-1 and T-2, the adjacent uprights of units I and II having bearing openings as 38 supporting the related axle shafts.

It will be seen from the foregoing that under the present invention there is afforded a rack comprising uprights so connected as to afford what have been designated sections, a plurality of such sections being arranged one behind the other so that the respective uprights thereof are in front to rear alignment affording partitioning rows. Such partitioning rows of uprights represent longitudinal dividers which define the longitudinal limits or sides of cubicles in the rack, and the bottom planes of these cubicles are afforded by the rollers which in turn have supporting connections at spaced points on the uprights. Accordingly, such arrangement enables elongated crates, broadloom carpet rolls, or like articles to be conveniently stored in the aforesaid cubicles or compartments of the rack. Not only does such facilitate and simplify storage problems encountered with articles of the foregoing kind by virtue of storage room segregation that is represented by the rack SR, but also the present invention enables quick selection to be made when it is desired to draw an article from storage.

While the sections designated herein above have embodied three uprights in laterally spaced relation, it will be appreciated that depending upon capacity such sections may embody but two uprights as can readily be appreciated from the way in which the intermediate rack unit III is in effect assembled of sections of uprights represented by the innermost uprights of the rack units I and II.

Hence, while I have illustrated and described the embodiment of my invention it is to be understood that this is capable of variation and modification, and I therefore do not wish to be limited to the precise details set forth, but desire to avail myself of such changes and alterations as fall within the purview of the following claims.

I claim:

1. In a storage rack of the kind described for storing elongated articles in a plurality of closely packed vertical tiers, at least two alike laterally spaced and separately fabricated outer rack units and each comprising a plurality of elongated tubular uprights arranged in opposed spaced apart parallel side-by-side lateral relation, said tubular uprights being formed with openings in the opposed lateral faces thereof for the reception of roller shafts, horizontal tubular tie members saddled on and welded to said uprights at the upper and lower extension thereof in each unit to afford a section for each unit, a plurality of such sections being arranged one behind the other in each unit with related uprights in such sections aligned in a plurality of parallel front-to-rear partitioning rows of uprights, outer ones of said uprights further defining limits of the front, rear, inner and outer sides of each rack unit, horizontal tubular tie members bolted to the upper portions of said uprights to afford a rigid lattice-work between the sections in each rack unit, rollers journaled on horizontal axle shafts having ends thereof supported in the openings provided at the inner faces of the uprights in each section of each rack unit, said rollers in each such section being spaced one above the other and between the first-named tubular tie members and the rollers between sections in each rack unit being aligned in common front-to-rear planes, said planes defining the bottom and top planes of a plurality of elongated storage cubicles for accommodating such articles in verticle side-by-side tiers while reposed on said rollers, and the side planes of said cubicles being defined by said uprights; said rack units being spaced one at the side of another to have the uprights at the inner sides thereof in spaced lateral alignment; and still other rollers journaled on horizontal axle shafts having ends thereof supported in openings provided at the faces of said uprights that are in spaced lateral alignment as aforesaid to thereby afford a third rack unit located between the first-named rack units and which also has cubicles, whereby said openings in the opposed lateral faces of said tubular uprights enable a plurality of rack units to be readily joined together in immediately adjacent side-by-side relation without the interposing of rack unit connecting structure between two immediately adjacent rack units.

2. A storage rack as defined in claim 1 wherein the openings in said tubular uprights are vertically aligned with one another so that the storage cubicles in each rack unit are vertically aligned with corresponding storage cubicles in an adjacent rack unit.

References Cited in the file of this patent

UNITED STATES PATENTS

| | | |
|---|---|---|
| 303,291 | Judge | Aug. 12, 1884 |
| 805,073 | Kellogg | Nov. 21, 1905 |
| 849,066 | Hahn | Apr. 2, 1907 |
| 1,133,598 | Winslow | Mar. 30, 1915 |
| 1,969,656 | Marlowe | Aug. 7, 1934 |
| 2,769,559 | Johnson | Nov. 6, 1956 |